(12) United States Patent
Sugita

(10) Patent No.: US 7,180,024 B2
(45) Date of Patent: Feb. 20, 2007

(54) OPERATING DEVICE

(75) Inventor: Koji Sugita, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/990,416

(22) Filed: Nov. 18, 2004

(65) Prior Publication Data

US 2005/0103612 A1   May 19, 2005

(30) Foreign Application Priority Data

Nov. 19, 2003   (JP)   ............... P2003-389872

(51) Int. Cl.
*H01H 13/00*   (2006.01)
(52) U.S. Cl. ..................... 200/341; 200/345
(58) Field of Classification Search ............. 200/341, 200/329, 342, 345, 1 B, 5 E, 11 R, 5 R
See application file for complete search history.

(56) References Cited

U.S. PATENT DOCUMENTS 5,345,050 A * 9/1994 Branch et al. ............. 200/341
5,442,152 A * 8/1995 Huang ...................... 200/345
6,156,986 A * 12/2000 Tsai ......................... 200/345
6,326,570 B1 * 12/2001 Fujii et al. ................. 200/520
6,635,831 B2 * 10/2003 Kato ........................... 200/4
6,774,321 B2 * 8/2004 Komatsu et al. ........... 200/1 B

FOREIGN PATENT DOCUMENTS

JP   2002-184266 A   6/2002

* cited by examiner

*Primary Examiner*—Elvin Enad
*Assistant Examiner*—M. Fishman
(74) *Attorney, Agent, or Firm*—Sughrue Mion, PLLC

(57) ABSTRACT

An operating device includes a switch member having a shaft holding part for holding a base end of a shaft member, an operating member having a mounting part formed in a substantially cylindrical shape which is adapted to be engaged with an end portion of the shaft member, and a stopper member which is engaged for mounting with the mounting part. The stopper member restricts relative movement of the shaft member in a state where a gap is left for permitting displacement of the shaft member in an axial direction, and releases the restriction when a load beyond a predetermined load in the axial direction of the shaft member is applied and locking members is deformed, thus permitting relative movement of the operating member with respect to the shaft member.

15 Claims, 11 Drawing Sheets

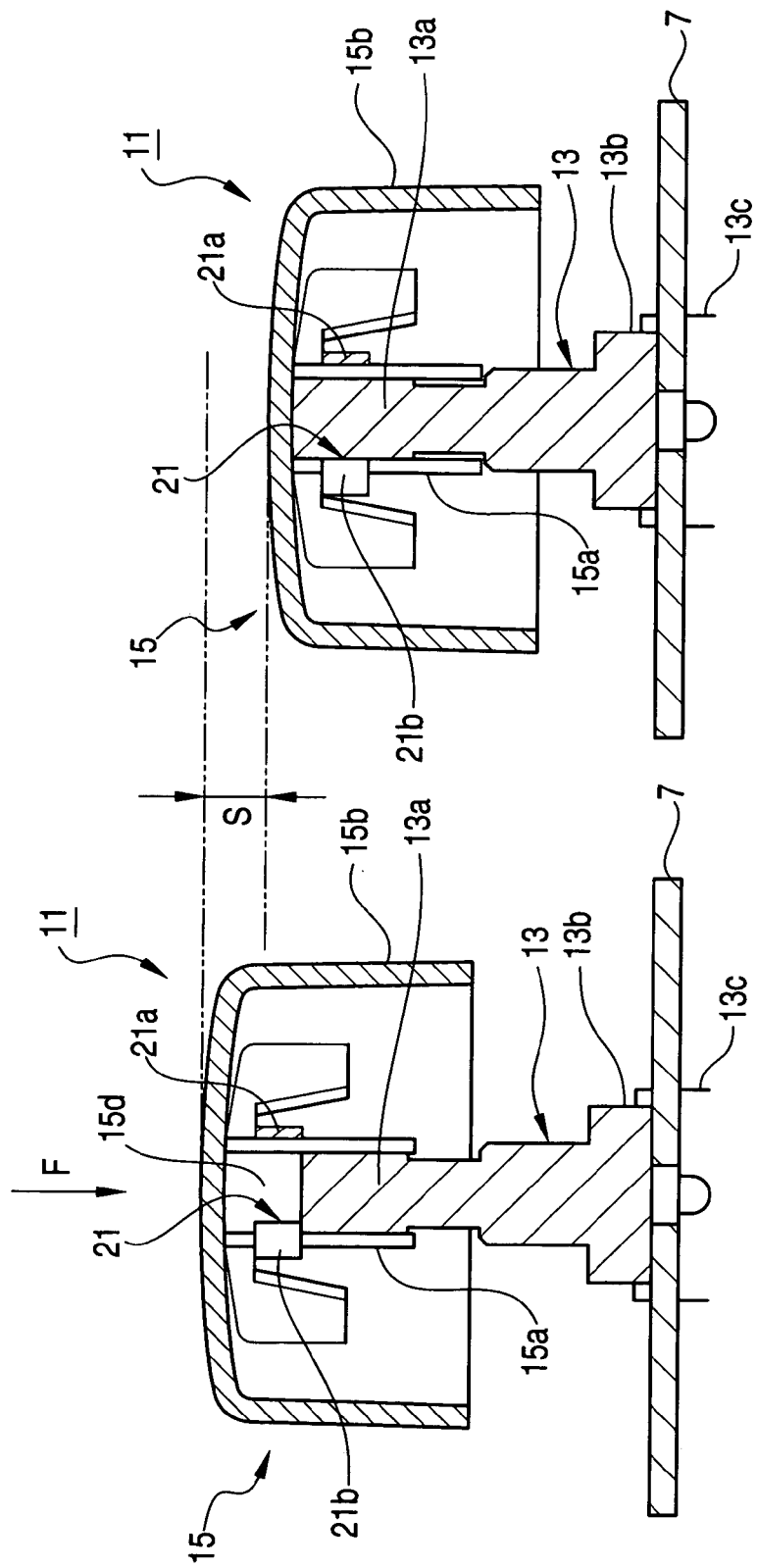

OPERATING DEVICE

BACKGROUND OF THE INVENTION

1. Field of the Invention

The present invention relates to an operating device.

2. Description of the Related Art

Conventionally, as an operating device including a switch member having a shaft member and an operating member having an engaging part with which the shaft member is engaged for mounting, there has been known a volume switch provided on an operating panel of an audio unit or the like for adjusting a level of sound volume, and so on.

In the above described operating device, specifically, the operating member is a knob which a user grips with his fingers or the like for rotational operation. The knob is mounted on the operating panel in a manner projected therefrom so that the rotational operation can be easily conducted.

By the way, in a case of mounting the above described operating device on an instrument panel of an automobile, in European area, following standards (1) and (2) are provided from a viewpoint of ensuring safety of passengers (especially children (infants)) in an event of a collision.

(1) A protruding amount of the operating member from a surface of the operating panel should be within a prescribed amount.

(2) In a case where the protruding amount of the operating member from the surface of the operating panel exceeds the prescribed amount, when a prescribed load is applied to the operating member in an axial direction, the operating member should be pushed down to the operating panel by this load so that the protruding amount of the operating member may be kept within the prescribed amount.

The prescribed load in the above described standard (2) is provided to prevent a child (an infant) from suffering injuries with a projected portion by a collision, and set to be about 378N (Newton), considering an impact load when a head of a child (infant) is struck.

The protruding amount of the operating member prescribed in the above standards (1) and (2) is specified to be the smallest necessary amount that the user can grip the operating member, in order to avoid an injury to the head of the child (the infant) caused by a contact of the head with a corner of the operating member, when the head is struck the operating panel.

Accordingly, in a case where the operating device is designed in compliance with the above described standard (1), a gripping allowance of the operating member cannot be sufficiently secured, and operability will be sacrificed.

In view of the above, it has been desired to develop an operating device which is designed so as to comply with the above described standard (2), without sacrificing the operability, while safety in an event of collision can be ensured.

FIGS. 1 and 2 show a conventional example of an operating device having such a structure as complying with the above described standard (2).

An operating device 1 herein disclosed is a volume switch which can be also used in an audio unit or the like mounted on a vehicle, and includes a switch member 3 having a shaft member 3a, and an operating member 5 having an engaging part 5a which has a substantially cylindrical shape and is adapted to be engaged with the shaft member 3a.

The switch member 3 has a shaft holding part 3b which holds the shaft member 3a in a rotatable manner, and incorporates therein a volume circuit in which circuitry resistance is varied by the rotation of the shaft member 3a. Moreover, lead terminals 3c, which are connected to a circuit board 7 arranged inside an operating panel (not shown) of an audio unit or the like, are projected from the shaft holding part 3b.

The operating member 5 includes a body part 5b having a headed tubular shape, which serves as a knob on occasion of rotational operation, and an engaging part 5a, which is uprightly provided at a center of an inner face of a head of the body part 5b, both of which are integrally formed of synthetic resin or the like.

An inner peripheral face of the engaging part 5a is spline-fitted to the shaft member 3a, and the rotation applied to the body part 5b becomes the rotation of the shaft member 3a as it is.

There are integrally provided ribs (steps) 6 on an inner periphery of the engaging part 5a, which are adapted to come into contact with a distal end of the shaft member 3a thereby to restrict an engaging depth of the shaft member 3a with respect to the engaging part 5a.

These ribs 6 restrict the engaging depth of the shaft member 3a in such a manner that a gap 9 for allowing an axial displacement of the shaft member 3a is left at the distal end of the shaft member 3a, and thus, a protruding amount of the operating member 5 from the operating panel (not shown) can be secured.

Moreover, when a load F beyond a predetermined load in an axial direction of the shaft member 3a is applied to the operating member 5 by a collision or the like, these ribs 6 will be scraped off, and the distal end of the shaft member 3a will intrude into the gap 9. As the results, the operating member 5 will be pushed down to the operating panel by a depth corresponding to the gap 9. Accordingly, the protruding amount of the operating member 5 will be within the amount prescribed in the standard (2). Therefore, an injury of the passengers in the vehicle by a collision against the operating member 5 will be reduced (for example refer to JP-A-2002-184266).

SUMMARY OF THE INVENTION

However, in a case where the operating member 5 is displaced by scraping off the ribs 6 as described above, because the ribs 6 are integrally formed with the operating member 5 which is a resin product, in order to adjust size of the ribs 6 so that the distal end of the shaft member 3a may sink in the operating panel up to a predetermined depth with a desired load, a number of adjustments must be given to a metal mold and prototype manufacturing must be repeated. Accordingly, there has been a problem, for example, that cost and time for development are increased.

Moreover, the above described ribs 6 will be gradually scraped away when a load in an axial direction is applied to the operating member 5. As shown in FIG. 3, the distal end of the shaft member 3a starts to sink in at an earlier stage while the load is below the desired amount. Therefore, there is an anxiety that not only by a collision of an accident, but even in a case where a more intensive impact than at a time of usual operation has been given to the operating member 5 by the passenger by mistake, a part of the ribs 6 may be scraped off and the operating member 5 may be pushed into the operating panel. As a result, a further problem occurs that operability may be lowered because of a shortage of the protruding amount of the operating member 5, or commercial value may be deteriorated because of disfigurement of an outer appearance.

According to an aspect of the invention, there is provided an operating device including: a switch member having a shaft member; an operating member having a mounting part which is mounted on an end portion of the shaft member; and a stopper member which restricts relative movement of the operating member with respect to the shaft member in a state where a gap for permitting relative displacement of the operating member with respect to the shaft member in an axial direction of the shaft member is left in the mounting part, wherein the stopper member is configured so as to release a restriction on the relative movement in a case where a load beyond a predetermined load is applied to the operating member in the axial direction of the shaft member.

BRIEF DESCRIPTION OF THE DRAWING

These and other objects and advantages of this invention will become more fully apparent from the following detailed description taken with the accompanying drawings in which:

FIGS. 8A and 8B are vertical sectional views for explaining a change in a protruding amount of the operating member when a load in an axial direction beyond a prescribed load is applied to the operating member in the operating device as shown in FIG. 4, in which FIG. 8A shows the operating member having the protruding amount in an original state, and FIG. 8B shows the operating member in a state where the protruding amount is decreased within the prescribed range by the load in the axial direction beyond the prescribed load;

FIGS. 11A and 11B show an operating device according to a second embodiment of the invention, in which FIG. 11A is a perspective view of a general structure of a stopper member, and FIG. 11B is a vertical sectional view of an essential part of the operating device;

FIGS. 12A and 12B show an operating device according to a third embodiment of the invention, in which FIG. 12A is a vertical sectional view of an essential part of the operating device, and FIG. 12B is a perspective view of a general structure of a stopper member;

FIGS. 13A, 13B and 13C show an operating device according to a fourth embodiment of the invention, in which FIG. 13A is a perspective view of a general structure of a stopper member, FIG. 13B is a plan view of the stopper member, and FIG. 13C is a vertical sectional view of an essential part of the operating device; and FIGS. 14A and 14B show an operating device according to a fifth embodiment of the invention, in which FIG. 14A is a vertical sectional view of an essential part of the operating device, and FIG. 14B is a perspective view of a general structure of a stopper member.

DETAILED DESCRIPTION OF THE PREFERRED EMBODIMENTS

Figure 1:
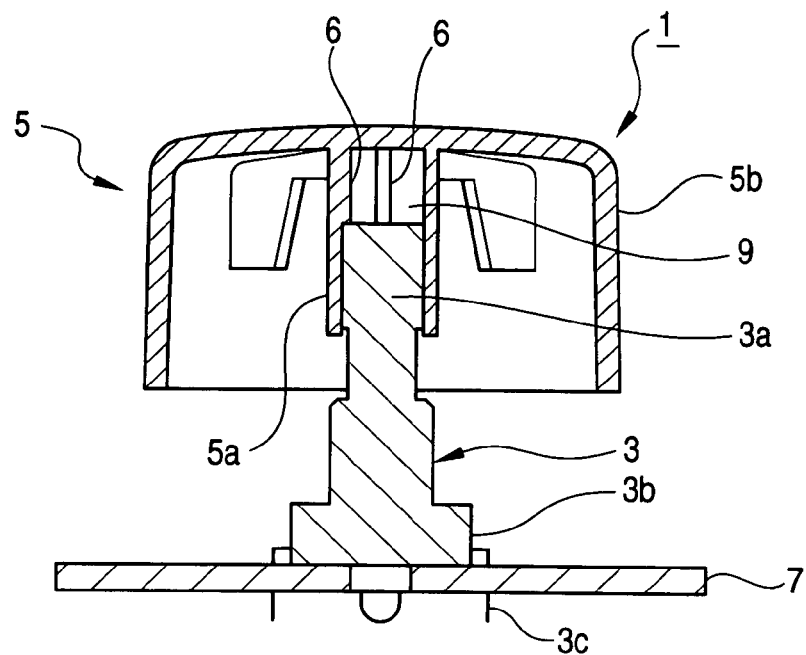
FIG. 1 is a vertical sectional view of a conventional operating device.
Figure 2:
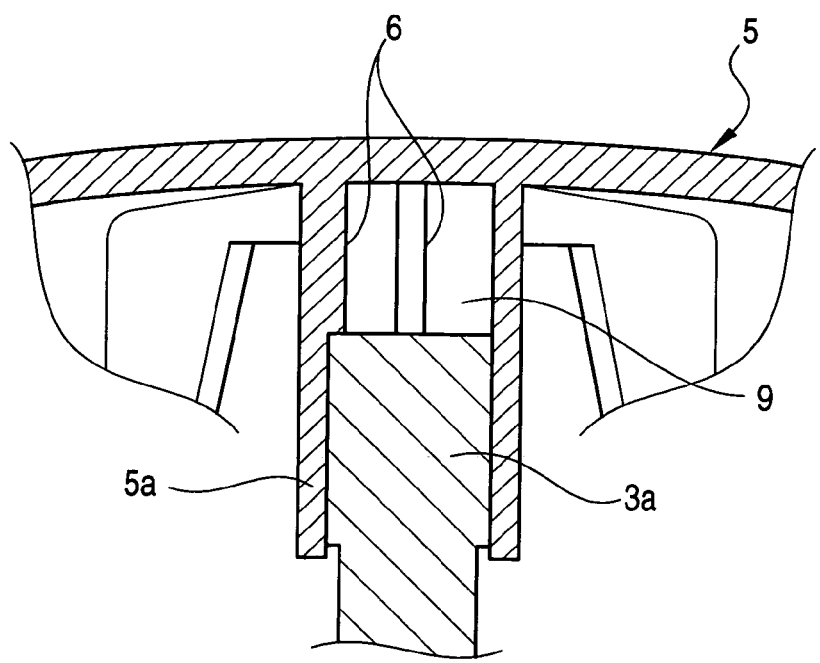
FIG. 2 is an enlarged view of an essential part of the conventional operating device as shown in FIG. 1.
Figure 3:
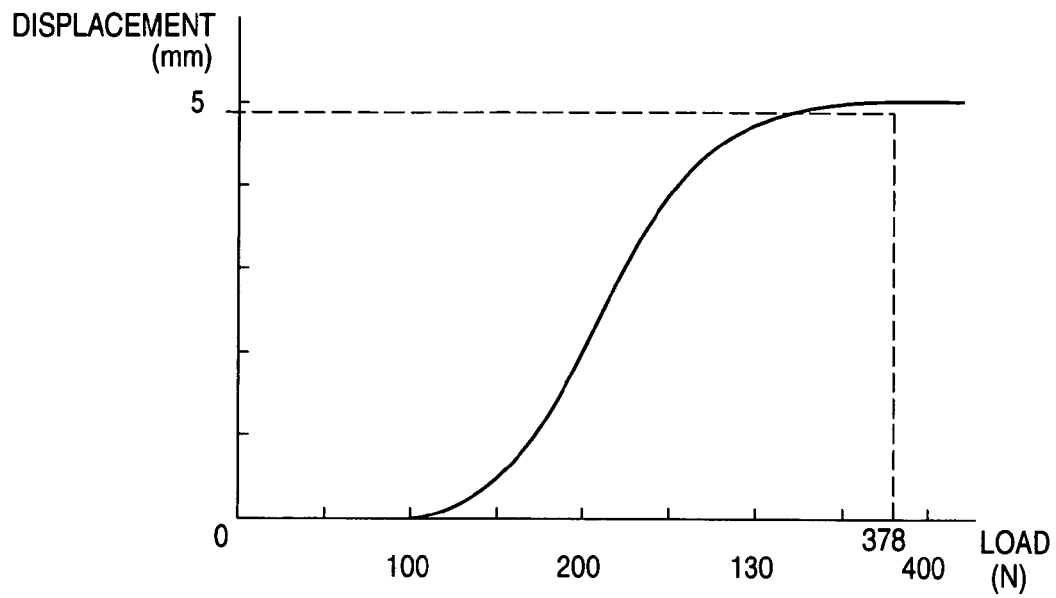
FIG. 3 is a view showing correlation between load and displacement when the operating member is displaced by the load applied in an axial direction, in the conventional operating device as shown in FIG. 1.

Mode for carrying out an operating device according to the invention will be described.

The operating device of the invention includes a switch member having a shaft member, an operating member having a mounting part which is mounted on an end portion of the shaft member, and a stopper member which restricts relative movement of the operating member with respect to the shaft member in a state where a gap for permitting relative displacement of the operating member with respect to the shaft member in an axial direction of the shaft member is left in the mounting part. In a case where a load beyond a predetermined load is applied to the operating member in the axial direction of the shaft member, the restriction by the stopper member is released, thereby permitting the relative movement of the operating member with respect to the shaft member.

Specifically, when the load beyond the predetermined load is applied to the operating member in an axial direction, the restriction by the stopper member, which is a separate body assembled to the mounting part of the operating member and the shaft member, will be released. Therefore the relative displacement of the operating member with respect to the shaft member will be permitted. Then, the operating member will be pushed down to the switch member by such a length as the shaft member intrudes into the gap which is heretofore secured by the stopper member, and thus, the protruding amount of the operating member from an operating panel or the like on which the operating device is mounted will be reduced.

Therefore, the operating member will not be accidentally pushed down by an action of the load below a prescribed load which is provided by the standards. As a result, excellent operability can be stably maintained for a long time, keeping a sufficient protruding amount of the operating member for easy handling, and at the same time, occurrence of the problem of disfigurement of the outer appearance can be avoided.

Moreover, when the load beyond the predetermined load is applied to the operating member in the axial direction of the shaft member, the stopper member is deformed or broken thereby to release the restriction. In this manner, it will be easy to actuate the stopper member at a stretch when the load in the axial direction applied to the operating member becomes more intensive than the predetermined load, as compared with the conventional operating device based on the continuous scraping behavior of the ribs integrally formed with the operating member which is a resin product. Therefore, it will not happen that the operating member is pushed down gradually from the stage where the load below the prescribed load is applied.

Further, the stopper member has a locking projection, the locking projection being so adapted as to come into contact with the end portion of the shaft member or the end portion of the mounting part, thereby to restrict the relative movement of the operating member with respect to the shaft member. In this manner, the relative movement of the operating member with respect to the shaft member can be easily restricted with a simple structure.

Still further, the predetermined load is set depending on a shape of the stopper member. In this manner, it will be easy to set the load by which the stopper member starts to be deformed or broken, and the relative movement of the operating member with respect to the shaft member can be stably permitted.

Still further, the stopper member has an engaging force adjusting ring part which is fitted over the mounting part of the operating member thereby to maintain an engaging force with respect to the shaft member at a predetermined engaging strength. In this manner, it is possible to achieve stabilization of the engaging strength between the shaft member and the mounting part.

Still further, the stopper member is formed of spring material made of metal by a press molding. In this manner, it will be easy to set the load by which the stopper member starts to be deformed, and the relative movement of the operating member with respect to the shaft member can be stably permitted.

By the way, it is to be noted that the above description that the mounting part of the operating member is mounted on the end portion of the shaft member includes a case where the mounting part is directly engaged with the shaft member, and a case where the mounting part is indirectly engaged with the shaft member by way of the stopper member or other members.

[Embodiment]

Now, an operating device according to an embodiment of the invention will be described in detail, referring to the attached drawings.

FIGS. 4 to 7 show the operating device according to a first embodiment of the invention.

Figure 4:
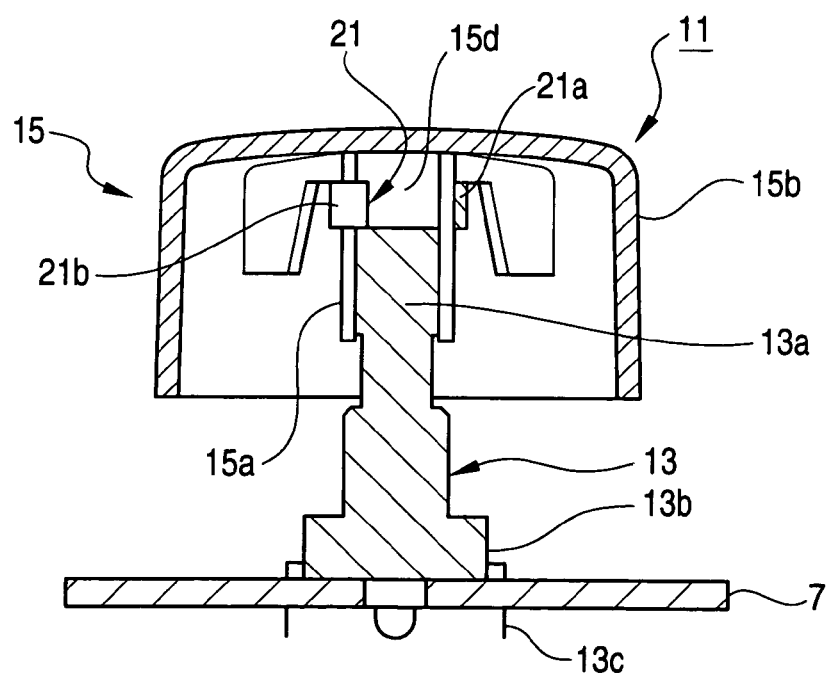
FIG. 4 is a vertical sectional view of an operating device according to a first embodiment of the invention.
Figure 5:
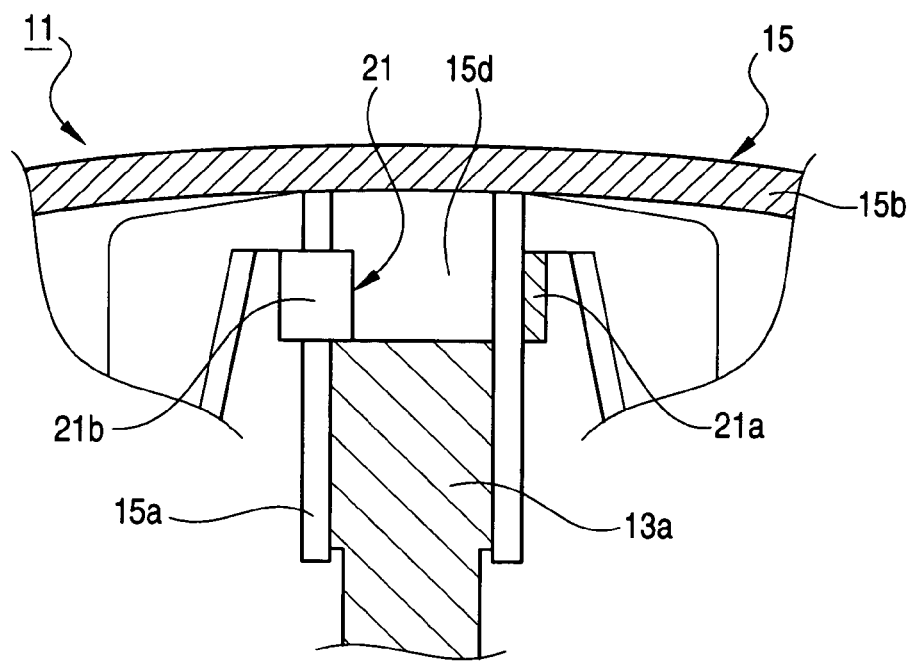
FIG. 5 is an enlarged view of an essential part of the operating device as shown in FIG. 4.

As shown in FIGS. 4 and 5, an operating device 11 of this first embodiment is also used as a volume switch in an audio unit or the like mounted on a vehicle, and includes a switch member 13 having a shaft holding part 13b for holding a base end of a shaft member 13a, an operating member 15 having a mounting part 15a, which has a substantially cylindrical shape and is adapted to be engaged with an end portion of the shaft member 13a, and a stopper member 21 adapted to be mounted on the mounting part 15a.

The switch member 13 is so constructed that a volume circuit in which circuitry resistance is varied with rotation of the shaft member 13a is incorporated in the shaft holding part 13b which holds the base end of the shaft member 13a in a rotatable manner. Lead terminals 13c connected to a circuit board 7, which is arranged inside the operating panel (not shown) of the audio unit or the like, are projected from this shaft holding part 13b.

Figure 6:
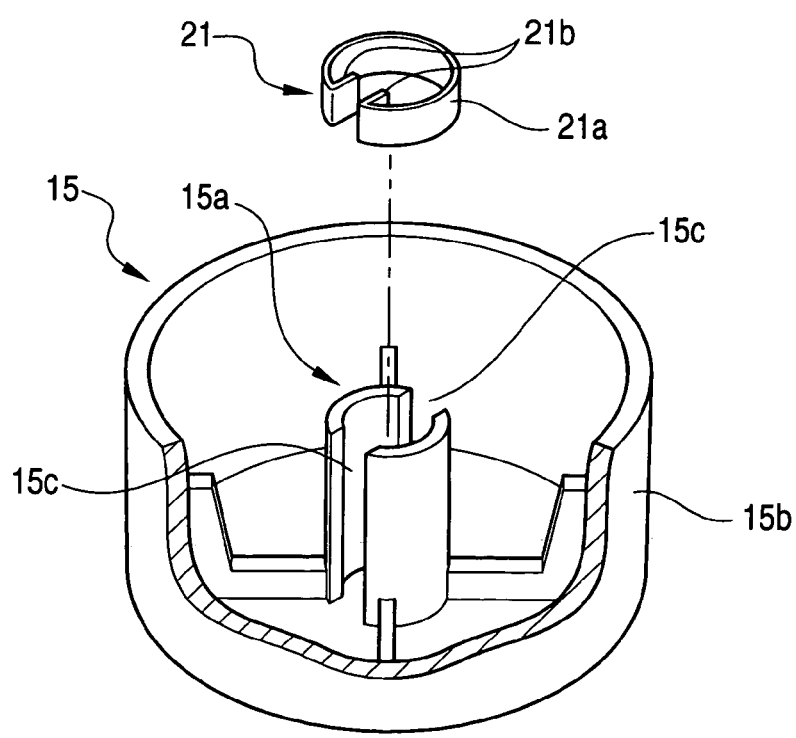
FIG. 6 is an exploded perspective view of an operating member as shown in FIGS. 4 and 5, which is seen from a back face side.
Figure 7:
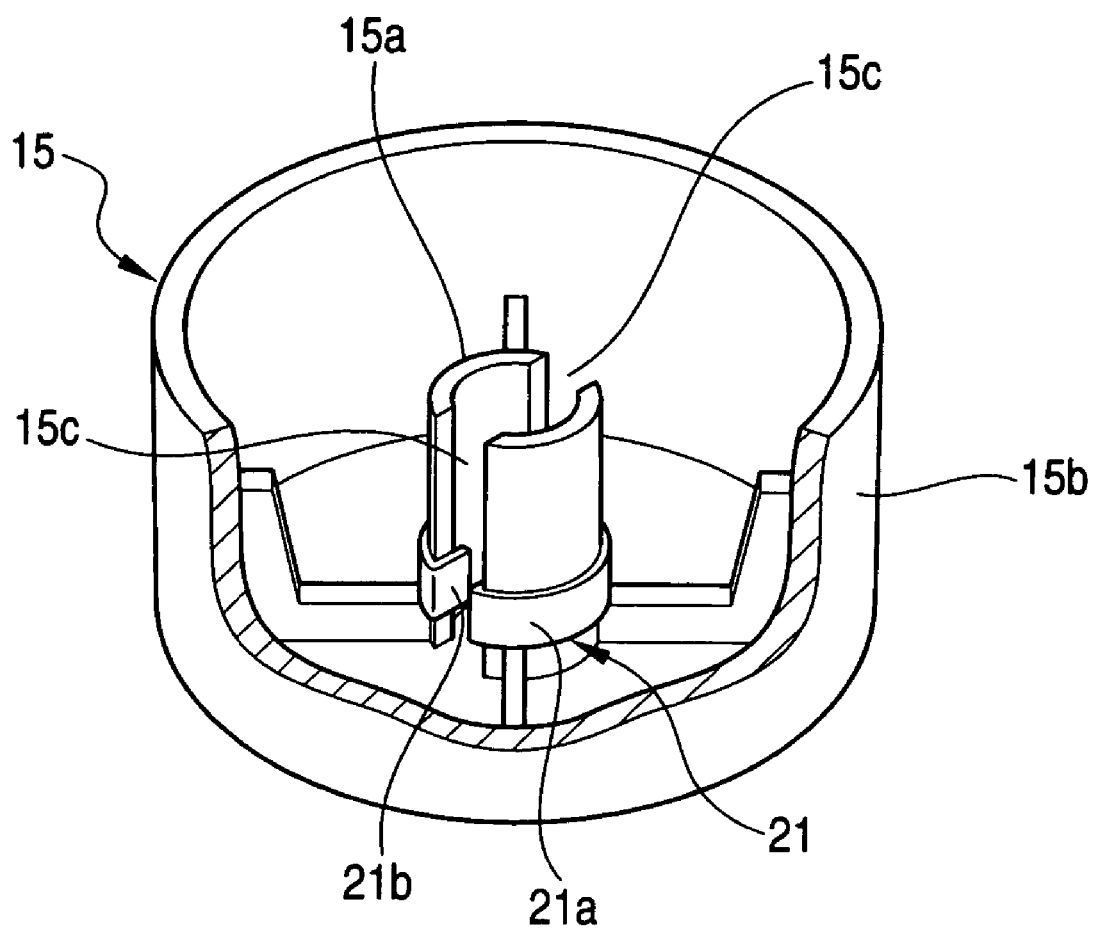
FIG. 7 is a perspective view of the operating member as shown in FIG. 6 in an assembled state.

As shown in FIGS. 6 and 7, the operating member 15 includes a body part 15b having a headed tubular shape and a large diameter which serves as a knob at a time of rotational operation, and a mounting part 15a provided in a substantially vertical direction at a center of an inner face of a head of the body part 15b, both of which are integrally formed of synthetic resin or the like.

An inner periphery of the mounting part 15a is spline-fitted to the shaft member 13a, and the rotation applied to the body part 15b becomes the rotation of the shaft member 13a as it is. Moreover, in this embodiment, the mounting part 15a is provided with slits 15c in an axial direction at two opposed positions on its peripheral wall in a cylindrical shape, as shown in FIG. 6.

The stopper member 21 is integrally formed of a strip-shaped spring material made of metal by a press molding, having an engaging ring part 21a, which has a substantially C-shape and is adapted to be engaged with an outer periphery of the mounting part 15a, and a pair of locking projections 21b, which are projected from both ends of the engaging ring part 21a inwardly in a radial direction into the mounting part 15a through the slits 15c formed in the mounting part 15a.

Then, the locking projections 21b projected into the mounting part 15a come into contact with the end portion of the shaft member 13a which is inserted into the mounting part 15a, whereby the stopper member 21 restricts an engaging depth of the shaft member 13a with respect to the mounting part 15a to such an extent that a gap 15d is left at the distal end of the shaft member 13a.

Specifically, the stopper member 21 restricts relative movement of the operating member 15 with respect to the shaft member 13a in a state where the gap 15d for permitting the relative movement of the operating member 15 with respect to the shaft member 13a in an axial direction of the shaft member 13a is left in the mounting part 15a. This gap 15d will allow displacement of the operating member 15 in an axial direction (which means an intrusion of the shaft member 13a into the gap 15d), when a positional restriction by the pair of the locking projections 21b is released.

Figure 9A:
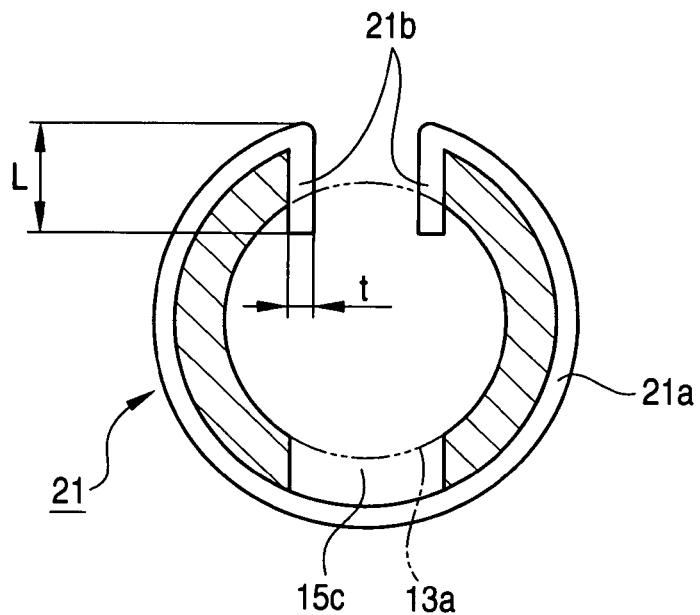
FIGS. 9A and 9B are cross sectional views for explaining deformation of a stopper member in the respective states of the operating device as shown in FIGS. 8A and 8B.
Figure 9B:
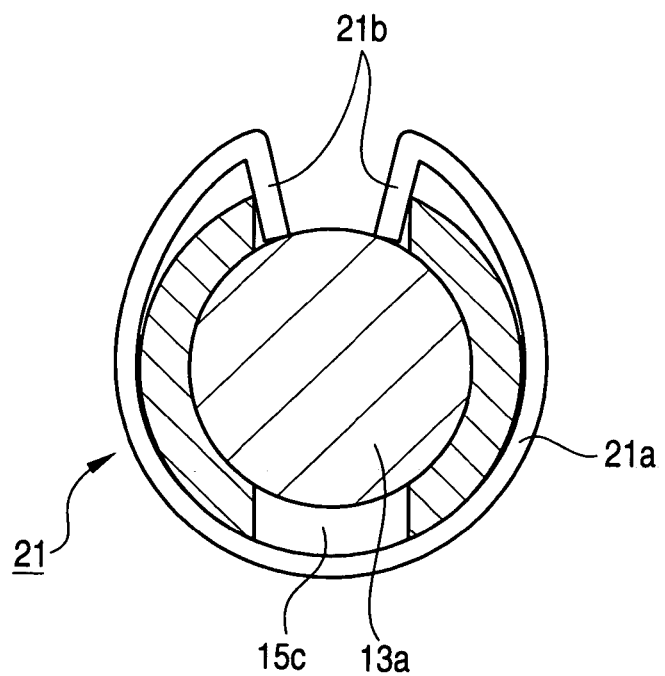

When a load F beyond the predetermined load is applied to the operating member 15 in the axial direction of the shaft member 13a, as shown in FIG. 8A, the engaging ring part 21a will be elastically deformed in a direction of enlarging its diameter in a vicinity of the locking projections 21b as shown in FIGS. 9A and 9B, and the locking projections 21b will be detached to an exterior of the mounting part 15a.

Because the locking projections 21b is detached from the mounting part 15a, engagement of the distal end of the shaft member 13a with the locking projections 21b will be released, so that the restriction of the engaging depth with respect to the shaft member 13a will be released.

When the restriction of the engaging depth by means of the stopper member 21 is released, the shaft member 13a intrudes into the gap 15d which is secured heretofore, as shown in FIG. 8B. Then, the operating member 15 is pushed down to the switch member 13, and the protruding amount of the operating member 15 will be decreased by an amount S corresponding to the depth of the gap 15d.

Although a sufficient protruding amount of the operating member 15 from the instrument panel or the like of the vehicle for easy handling at the rotational operation is originally secured, the amount S corresponding to the depth of the gap 15d is set so that the protruding amount may become below the prescribed standard protruding amount for ensuring safety at a collision, when the protruding amount is decreased by the amount S corresponding to the depth of the gap 15d by the intrusion of the shaft member 13a into the gap 15d.

More specifically, according to the operating device 11 in the embodiment described above, when the prescribed load F in the axial direction is applied to the operating member 15, the locking projections 21b of the stopper member 21 which is a separate body assembled to the operating member 15 are deformed, thereby to permit the relative movement of the operating member 15 with respect to the shaft member 13a. Then, the operating member 15 is pushed down to the switch member 13 by the amount of intrusion of the shaft member 13a into the gap 15d which is heretofore secured by the stopper member 21, and thus, the protruding amount of the operating member 15 from the operating panel or the like on which the operating device 11 is mounted will be decreased.

As a result, the protruding amount of the operating member 15 will be rapidly decreased within the prescribed range for ensuring safety at the time of collision, and thus, it is possible to ensure safety at the time of collision.

According to such operation for releasing the positional restriction by the deformation of the stopper member 21 as described above, it will be easy to actuate the stopper member 21 at a stretch when the load in the axial direction applied to the operating member 15 becomes beyond the predetermined load, as compared with the conventional operating device 1 (See FIG. 1) based on the continuous scraping behavior of the ribs 6 integrally formed with the operating member 5 which is a resin product. Therefore, it will not happen that the operating member 15 is pushed down gradually from a stage where the load below the prescribed load is applied.

Consequently, in a case where the load applied to the operating member 15 is below the prescribed load provided by the standards, the operating member 15 will not be accidentally pushed down by the action of the load below the prescribed load. In this manner, it will be possible to maintain excellent operability stably and for a long time, keeping a sufficient protruding amount of the operating member 15 for easy handling, and occurrence of a problem of disfigurement of an outer appearance can be avoided.

Moreover, because the stopper member 21 is an independent component which is separate from the operating member 15, developing research for reducing the protruding amount of the operating member 15 within the prescribed range can be conducted independently, without necessity of modifying the molding die for the operating member 15, and so, the cost and time for development can be reduced.

Further, the operating device 11 in this embodiment has such a simple structure that the stopper member 21 includes an engaging ring part 21a which is integrally formed of spring material made of metal by a press molding and adapted to be engaged with the mounting part 15a, and the deformable locking projections 21b which are projected radially inwardly from both the ends of the engaging ring part 21a. Therefore, reduction of the cost can be achieved by mass production. In addition, by adjusting spring property and structural rigidity of the spring material made of metal to be employed, the deformation of the locking projections 21b can be set to either elastic deformation or plastic deformation, for example, and therefore, flexibility in designing the stopper member 21 will be enhanced, thereby to attain easy manufacturing of the operating device 11.

Still further, in a case where the restriction of the engaging depth is released by the displacement of the locking projections 21b due to the elastic deformation of the engaging ring part 21a, when the load beyond the predetermined load (the prescribed load) is received in the axial direction like the stopper member 21 in this embodiment, it is possible to easily adjust correlation between the load by which the deformation starts and an amount of deformation occurring in the locking projections 21b, by changing set values of a thickness t of a metal plate or a projecting length L of the locking projections 21b as shown in FIG. 9A.

Figure 10:
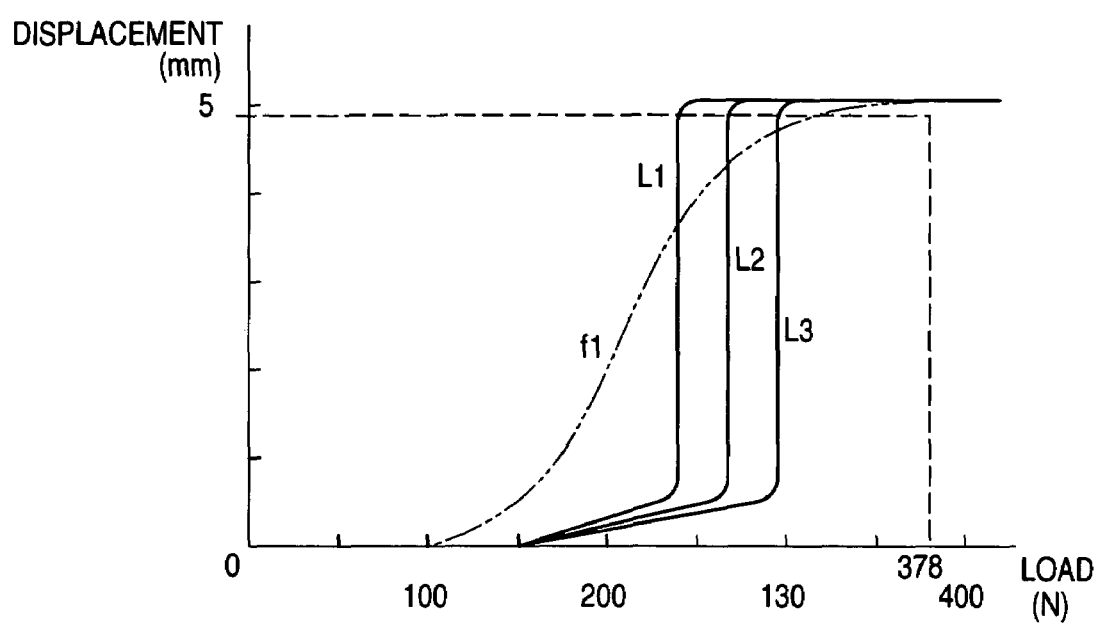
FIG. 10 is a view showing correlation between the load and the displacement when the operating member is displaced by the load applied in the axial direction, in the operating device as shown in FIG. 4.

For example, when the projecting length L of the locking projections 21b is set to be L1<L2<L3 in an order from small to large in size, the locking projections 21b having larger projecting length will start to be deformed by larger loads, as shown in FIG. 10. Therefore, it is understood that the predetermined load can be easily changed by varying the projecting length of the locking projections 21b.

Still further, as shown in FIG. 10, it is remarkably observed that the deformation by the stopper member 21 tends to advance at once at a limited load, irrespective of extent of the projecting length of the locking projections 21b. Apparently, occurrence of such an inconvenience that the operating member 15 may be unintentionally pushed down by the action of the load below the prescribed load by an erroneous operation or so can be prevented, as compared with a feature f1 in the conventional case where the operating member 5 is pushed down by scraping off the ribs 6 which are integral with the operating member 5, as shown in FIG. 1.

Figure 11B:
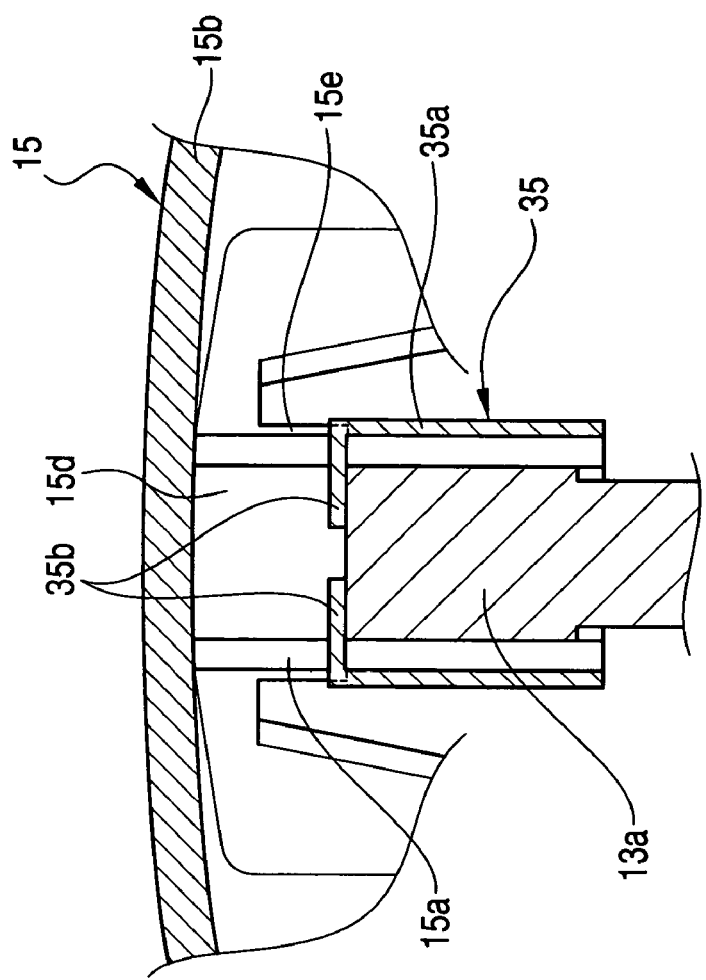
Figure 11A:
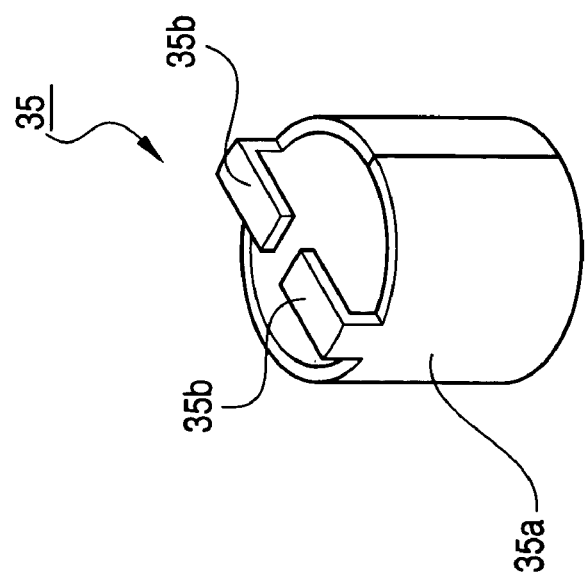

FIGS. 11A and 11B shows an operating device according to a second embodiment of the invention.

A stopper member 35 according to this second embodiment includes an engaging ring part 35a formed in a substantially cylindrical shape and adapted to be engaged with the outer periphery of the mounting part 15a, as shown in FIG. 11B, and a pair of locking projections 35b which respectively extend from an end edge in the axial direction of the engaging ring part 35a radially inwardly in a manner opposed to each other, and intrude into the mounting part 15a through the slits 15c of the mounting part 15a.

The engaging ring part 35a has a cylindrical shape which is longer in an axial length than the engaging ring part 21a in the above described first embodiment, and the locking projections 35b have a different shape from those in the first embodiment, in a developed view, so that a larger contact face can be obtained with the end face of the shaft member 13a. Moreover, the one end edge in the axial direction of the engaging ring part 35a is allowed to be contacted with distal ends (lower ends in the drawing) of positioning ribs 15e which are projected from the outer peripheral face of the mounting part 15a, and thus, the engaging ring part 35a is positioned with respect to the mounting part 15a.

The stopper member 35 in this embodiment is so constructed that when the load beyond the predetermined load is applied, a pair of the locking projections 35b themselves are elastically deformed or plastically deformed in the axial direction of the mounting part 15a thereby to release restriction of the engaging depth.

Moreover, because the stopper member 35 may be formed of resin or the like in such a manner that when a load beyond the predetermined load is applied, the engaging ring part 35a itself or the locking projections 35b may be broken thereby to release the restriction of the relative movement of the operating member 15 with respect to the shaft member 13a. In this case, a predetermined position of the stopper member may be made thinner in thickness or provided with a cut-in, so that the stopper member 35 may be broken at the predetermined position, when the load beyond the predetermined load is applied.

Figure 12A:
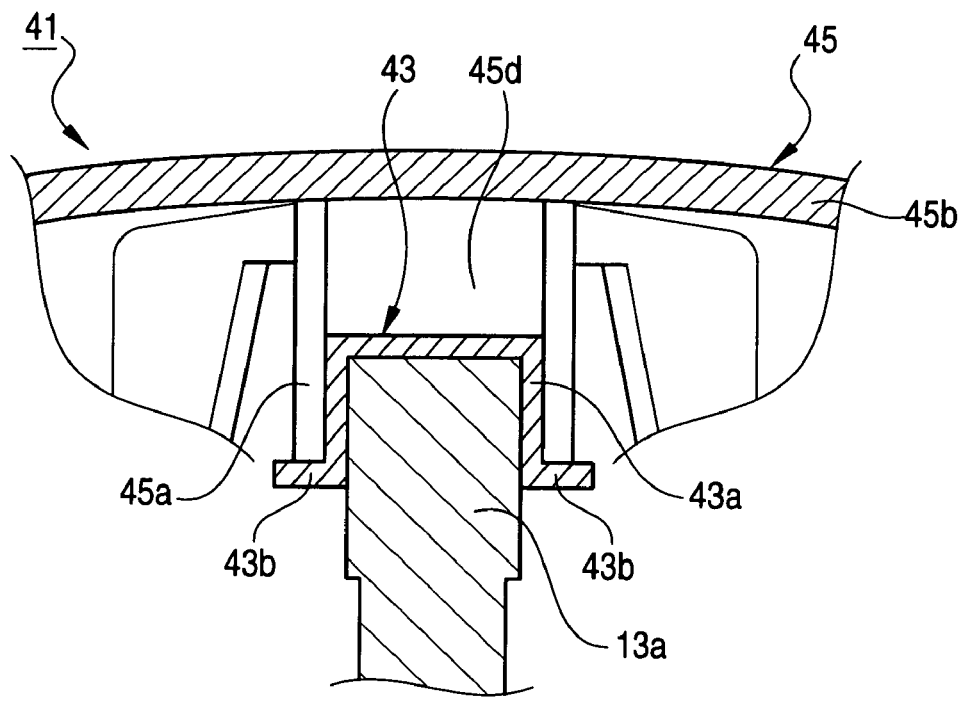
Figure 12B:
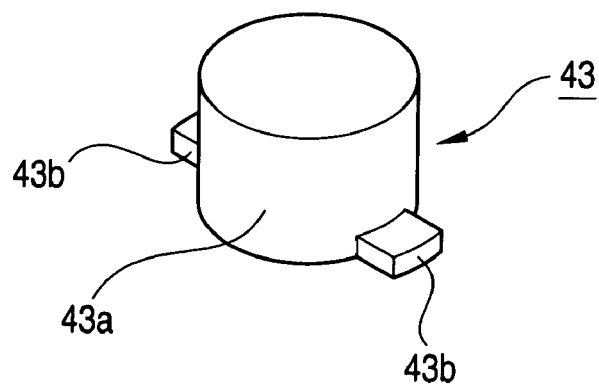

FIGS. 12A and 12B shows an operating device according to a third embodiment of the invention.

In an operating device 41 in this third embodiment, restriction of relative movement of a mounting part 45a of an operating member 45 with respect to the shaft member 13a is conducted by a stopper member 43.

The operating member 45 includes, as shown in FIG. 12A, a body part 45b having a headed tubular shape and a large diameter, which serves as a knob at a time of rotational operation, and a mounting part 45a having a cylindrical shape and provided in a substantially vertical direction at a center of an inner face of a head of the body part 45b, both of which are integrally formed of synthetic resin or the like. The shaft member 13a is press-fitted into the mounting part 45a interposing the stopper member 43, and rotation given to the body part 45b becomes the rotation of the shaft member 13a as it is.

The stopper member 43 in this embodiment is integrally formed with a crown part 43a having a headed cylindrical shape which is adapted to be mounted on the end portion of the shaft member 13a, and a pair of locking projections 43b projecting radially outwardly from an opening end of this crown part 43a, as shown in FIGS. 12A and 12B.

Then, the locking projections 43b of this stopper member 43 come into contact with a distal end (a lower end in FIG. 12A) of the mounting part 45a, mounting depth of the shaft member 13a with respect to the mounting part 45a will be restricted in a state where a gap 45d is left at the distal end of the shaft member 13a.

Specifically, the stopper member 43 will restrict the relative movement of the operating member 45 with respect to the shaft member 13a in a state where the gap 45d for permitting the relative movement of the operating member 45 with respect to the shaft member 13a in the axial direction of the shaft member 13a is left in the mounting part 45a. This gap 45d permits displacement of the operating member 45 in an axial direction (which means an intrusion of the shaft member 13a into the gap 45d), when a positional restriction by the pair of the locking projections 43b is released.

The stopper member 43 in this embodiment is so constructed that when a load beyond the predetermined load is applied, the pair of the locking projections 43b themselves are elastically deformed or plastically deformed in an axial direction of the mounting part 45a thereby to release restriction of the engaging depth.

Moreover, because the stopper member 43 may be formed of resin or the like in such a manner that when a load beyond the predetermined load is applied, the crown part 43a itself or the locking projections 43b may be broken thereby to release restriction of the relative movement of the operating member 45 with respect to the shaft member 13a. In this case, a predetermined position of the stopper member may be made thinner in thickness or provided with a cut-in, so that the stopper member may be broken at the predetermined position when the load beyond the predetermined load is applied.

Figure 13A:
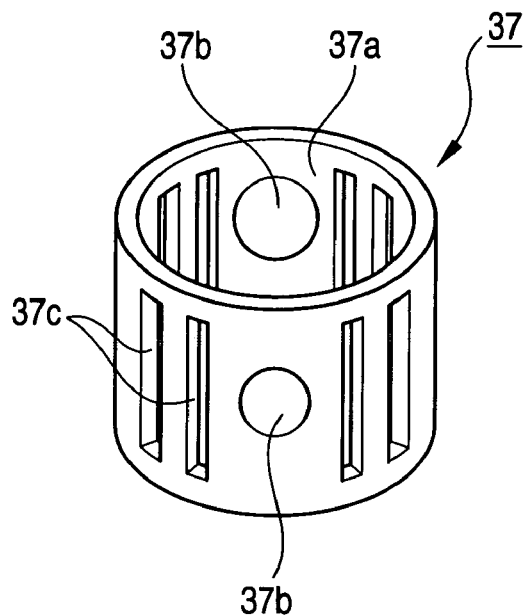
Figure 13B:
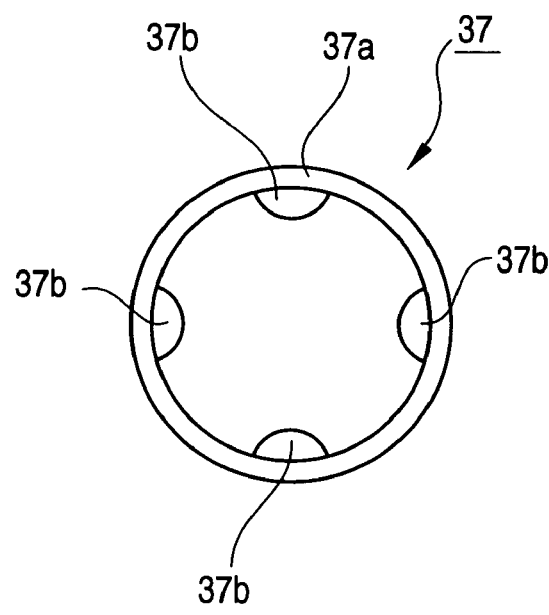
Figure 13C:
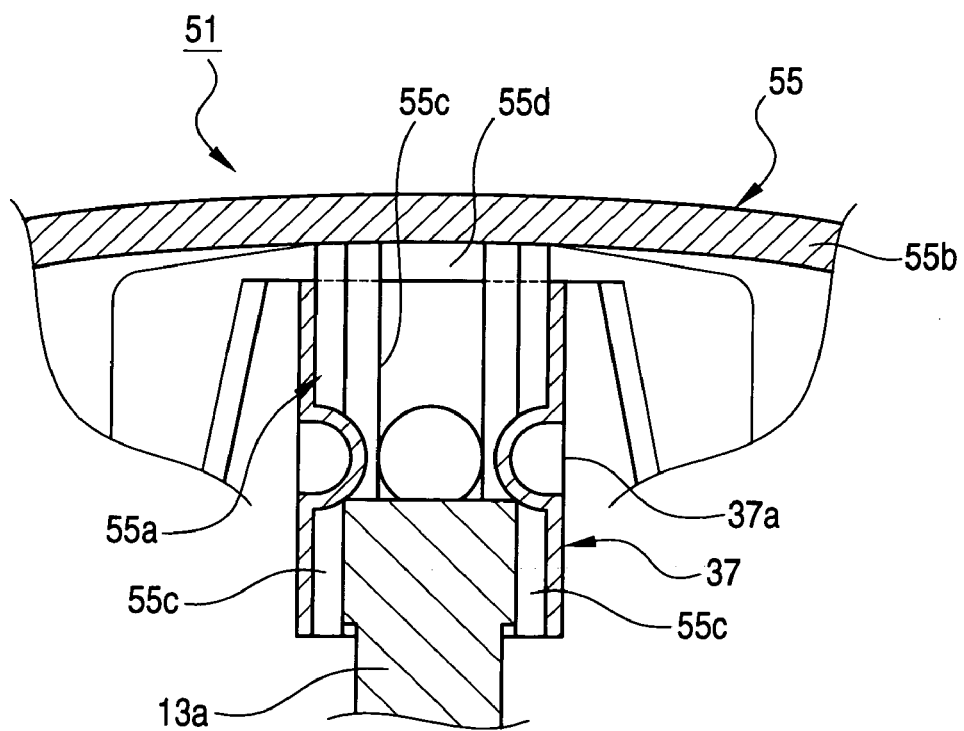

FIGS. 13A to 13C show a stopper member in an operating device according to a fourth embodiment of the invention.

In an operating device 51 in this fourth embodiment, restriction of mounting depth of a mounting part 55a of an operating member 55 with respect to the shaft member 13a is conducted by a stopper member 37.

As shown in FIG. 13C, the operating member 55 includes a body part 55b having a headed tubular shape and a large diameter, which serves as a knob at a time of rotational operation, and a mounting part 55a having a substantially cylindrical shape and provided in a substantially vertical direction at a center of an inner face of a head of the body part 55b, both of which are integrally formed of synthetic resin or the like. The mounting part 55a is provided with slits 55c in the axial direction at four positions on its peripheral wall which is formed in a cylindrical shape.

The stopper member 37 is formed integrally having an engaging ring part 37a, which has a cylindrical shape and is adapted to be engaged for mounting with an outer periphery of the mounting part 55a, and four locking projections 37b which are embossed by press work or the like in a direction from an outer peripheral face to an inner diameter of this engaging ring part 37a, and projected into the mounting part 55a through the slits 55c formed in the mounting part 55a.

Then, the locking projections 37b of the stopper member 37 projected into the mounting part 55a come into contact with the end portion of the shaft member 13a which is inserted into the mounting part 55a, so that engaging depth of the shaft member 13a with respect to the mounting part 55a will be restricted in a state where a gap 55d is left at the distal end of the shaft member 13a.

When the load beyond the predetermined load is applied along the axial direction of the shaft member 13a, the locking projections 37b will be crushed thereby to release restriction of the mounting depth with respect to the shaft member 13a.

In the embodiment as shown in FIGS. 13A to 13C, the engaging ring part 37a is provided with a plurality of slits 37c extending in an axial direction, at an appropriate interval in a circumferential direction. These slits 37c are utilized for the purpose of adjusting mechanical strength of the engaging ring part 37a so that the locking projections 37b may be deformed when the load beyond the predetermined load is applied, and also for the purpose of achieving light weight of the stopper member 37.

Moreover, the stopper member 37 may be formed of resin or the like in such a manner that when the load beyond the predetermined load is applied, the engaging ring part 37a itself or the locking projections 37b may be broken thereby to release restriction of the relative movement of the operating member 55 with respect to the shaft member 13a.

Figure 14A:
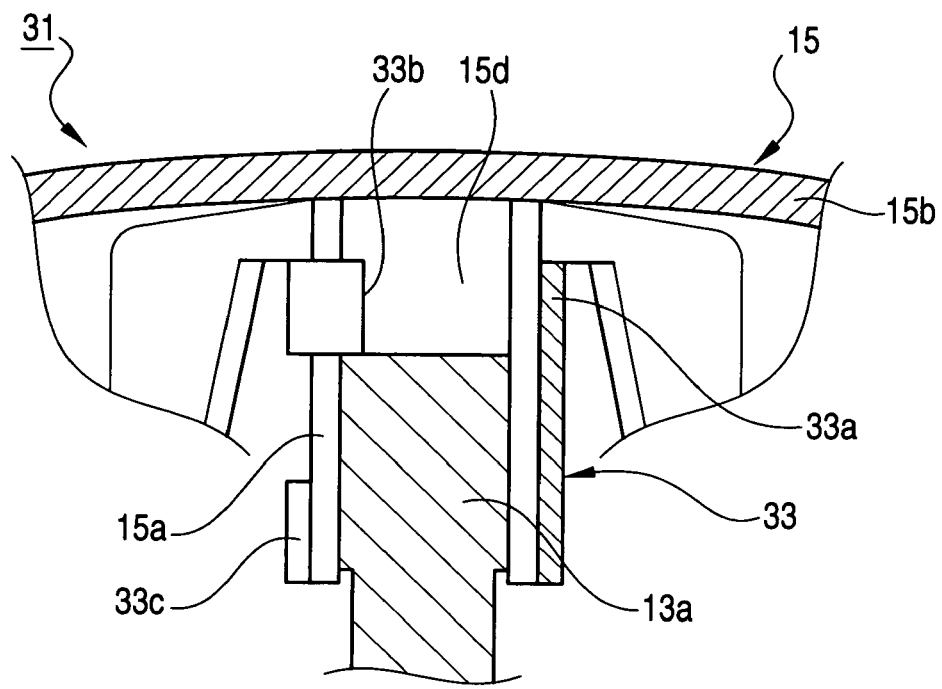
Figure 14B:
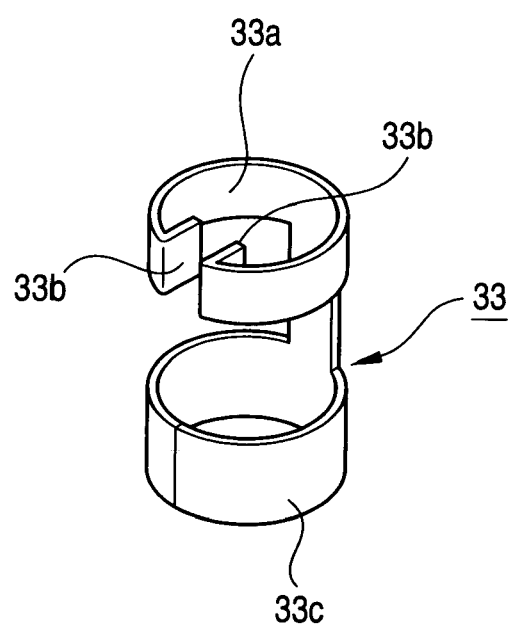

FIGS. 14A and 14B show an operating device according to a fifth embodiment of the invention.

In an operating device 31 in this fifth embodiment, restriction of the engaging depth of the shaft member 13a with respect to the mounting part 15a of the operating member 15 is conducted by a stopper member 33. Because other members than the stopper member 33 in this embodiment are common to those in the above described first embodiment, the common members will be denoted with the same reference numerals, and further explanation will be omitted.

As shown in FIG. 14A, the stopper member 33 in this embodiment includes an engaging ring part 33a having a substantially C shape and adapted to be engaged for mounting with the outer periphery of the mounting part 15a, a pair of locking projections 33b which are projected from both ends of this engaging ring part 33a radially inwardly, and adapted to protrude into the mounting part 15a through the slits 15c formed in the mounting part 15a, and an engaging force adjusting ring part 33c adapted to be fitted over the distal end (a lower end in FIG. 14A) of the mounting part 15a to keep the engaging force with respect to the shaft member 13a at a predetermined engaging strength, all of which are integrally formed of a metal plate by a press molding.

According to the stopper member 33 in this embodiment, stabilization of the engaging strength of the mounting part 15a with respect to the shaft member 13a can be achieved, without an increase of components in number, and at the same time, a slack of the engagement between the shaft member 13a and the mounting part 15a caused by external vibrations or the like which they receive in a state mounted on the vehicle can be prevented.

It is apparent that the structures including the shaft members, shaft holding parts, switch members, engaging parts, operating members, stopper members, etc. in the operating devices according to the invention are not restricted to the structures in the above described embodiments, but various modes can be employed on the basis of gist of the invention.

Moreover, the operating devices of the invention are not exclusively applied to the volume switch for the audio unit as shown in the above described embodiments, but can be widely applied to a push button, a rotary switch, a control knob and so on, in various apparatuses mounted on vehicles, such as an air conditioner in which a protruding amount of the operating member is standardized for safety on occasion of collision or the like.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An operating device comprising:
a switch member having a shaft member;
an operating member having a mounting part which is mounted on an end portion of the shaft member; and
a stopper member which restricts relative movement of the operating member with respect to the shaft member in a state where a gap for permitting relative displacement of the operating member with respect to the shaft member in an axial direction of the shaft member is left in the mounting part, wherein
the stopper member is a separate body assembled to the mounting part of the operating member and configured so as to release a restriction on the relative movement in a case where a load beyond a predetermined load is applied to the operating member in the axial direction of the shaft member, and
wherein the mounting part is directly engaged with the shaft member.

2. The operating device according to claim 1, wherein the stopper member releases the restriction on the relative movement by at least one of deformation and destruction thereof.

3. The operating device according to claim 1, wherein
the stopper member has a locking projection, and
the relative movement is restricted due to a contact between the locking projection and the end portion of the shaft member.

4. The operating device according to claim 2, wherein
the stopper member has a locking projection, and
the relative movement is restricted due to a contact between the locking projection and the end portion of the shaft member.

5. The operating device according to claim 1, wherein
the stopper member has a locking projection, and
the relative movement is restricted due to a contact between the locking projection and an end portion of the mounting part.

6. The operating device according to claim 2, wherein
the stopper member has a locking projection, and
the relative movement is restricted due to a contact between the locking projection and an end portion of the mounting part.

7. The operating device according to claim 1, wherein the predetermined load is set according to a shape of the stopper member.

8. The operating device according to claim 1, wherein the stopper member has an adjusting member which is fitted over the mounting part so as to maintain an engaging force of the mounting part with respect to the shaft member at a determined engaging strength.

9. The operating device according to claim 1, wherein the shaft member is rotatable.

10. The operating device according to claim 9, wherein a rotation applied to the operating member rotates the shaft member.

11. The operating device according to claim 9, wherein rotation of the rotatable shaft member varies a circuitry resistance of a volume circuit.

12. An operating device comprising:
a switch member having a rotatable shaft member;
an operating member having a mounting part which is mounted on an end portion of the rotatable shaft member; and
a stopper member which restricts relative movement of the operating member with respect to the rotatable shaft member in a state where a gap for permitting relative displacement of the operating member with respect to the rotatable shaft member in an axial direction of the shaft member is left in the mounting part, wherein
the stopper member is configured so as to release a restriction on the relative movement in a case where a load beyond a predetermined load is applied to the operating member in the axial direction of the rotatable shaft member.

13. The operating device according to claim 12, wherein rotation of the rotatable shaft member varies a circuitry resistance of a volume circuit.

14. The operating device according to claim 12, wherein the stopper member is a separate body assembled to the mounting part of the operating member.

15. The operating device according to claim 12, wherein a rotation applied to the operating member rotates the shaft member.

* * * * *